United States Patent [19]

Bouldin et al.

[11] Patent Number: 4,753,864
[45] Date of Patent: Jun. 28, 1988

[54] HIGH CONTRAST OPTICAL MEMORY TAPE

[75] Inventors: Eric W. Bouldin, Atherton; Jerome Drexler, Los Altos Hills, both of Calif.

[73] Assignee: Drexler Technology Corporation, Mountain View, Calif.

[21] Appl. No.: 39,507

[22] Filed: Apr. 16, 1987

Related U.S. Application Data

[63] Continuation-in-part of Ser. No. 935,999, Nov. 28, 1986, which is a continuation-in-part of Ser. No. 896,988, Aug. 15, 1986, abandoned, and Ser. No. 855,228, Apr. 23, 1986.

[51] Int. Cl.⁴ .................... G03C 1/72; G03C 1/78; G03C 1/94
[52] U.S. Cl. .................................. 430/273; 430/275; 430/277; 430/278; 430/290; 430/346; 430/495; 430/525; 430/616; 430/945; 430/964; 346/135.1
[58] Field of Search ............. 346/135.1; 430/616, 430/945, 273, 275, 277, 278, 290, 964, 495, 346, 525

[56] References Cited

U.S. PATENT DOCUMENTS

| | | | |
|---|---|---|---|
| 4,239,338 | 12/1980 | Borrelli et al. | 350/155 |
| 4,269,917 | 5/1981 | Drexler et al. | 430/16 |
| 4,278,756 | 7/1981 | Bouldin et al. | 430/414 |
| 4,278,758 | 7/1981 | Drexler et al. | 430/616 |
| 4,343,879 | 8/1982 | Drexler et al. | 430/14 |
| 4,588,665 | 5/1986 | Drexler | 430/12 |
| 4,636,804 | 1/1987 | Kuder | 430/964 X |
| 4,673,626 | 6/1987 | Takeda et al. | 430/14 |
| 4,692,394 | 9/1987 | Drexler | 430/140 |

Primary Examiner—Roland E. Martin
Assistant Examiner—Lee C. Wright
Attorney, Agent, or Firm—Thomas Schneck

[57] ABSTRACT

A medium in tape form for laser recorded optical information featuring a gelatin layer having a thin black crust at the top of the layer. The crust is formed by developed black irregular silver particles within the top 0.5 micron of a gelatin colloid matrix. The remainder of the colloid matrix is substantially clear gelatin and a reflective metallic layer is disposed below the gelatin. The tape may be disposed on reels and may be pre-patterned during formation of the crust with indicia, such as servo track guides or timing marks. User data may be recorded by modification of the black silver particles in the crust with a laser to expose the reflective underlayer. A laser or other light source is used to read data on the medium with optical contrast between the black surface and the reflective metallic layer underlying the gelatin layer which can be observed in the recorded spots.

13 Claims, 3 Drawing Sheets

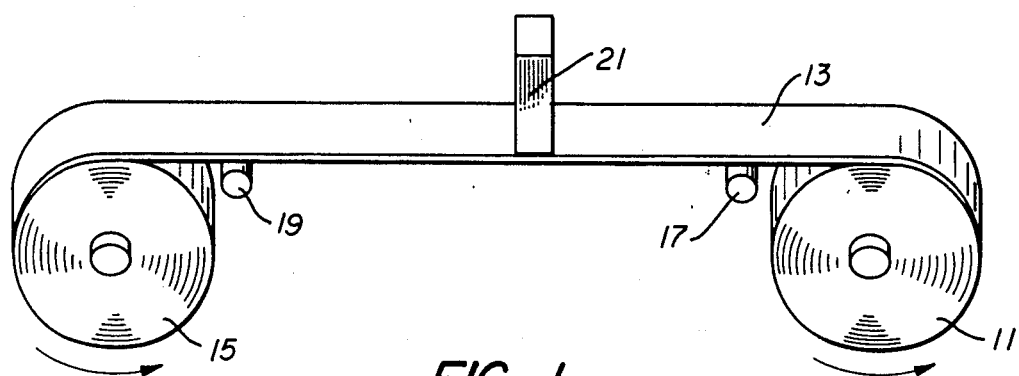
FIG._1.
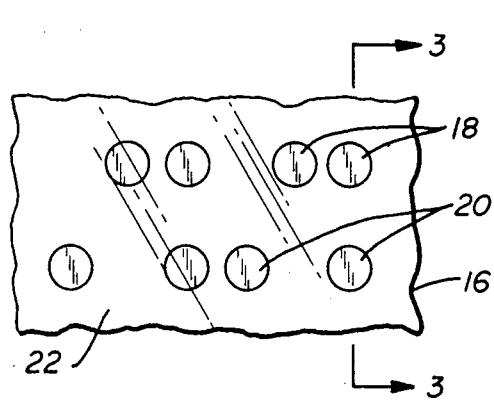
FIG._2.
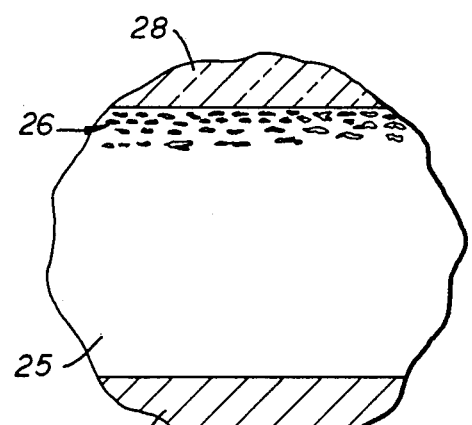
FIG._3A.
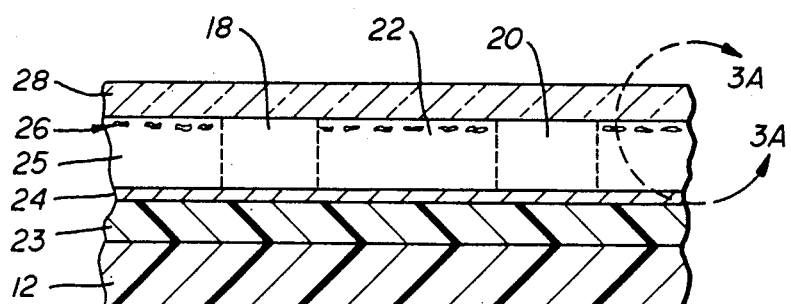
FIG._3.
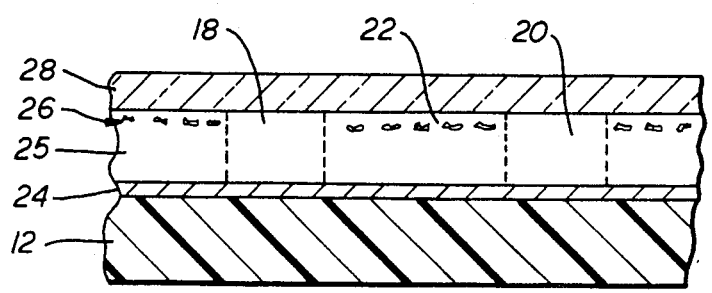
FIG._3B.

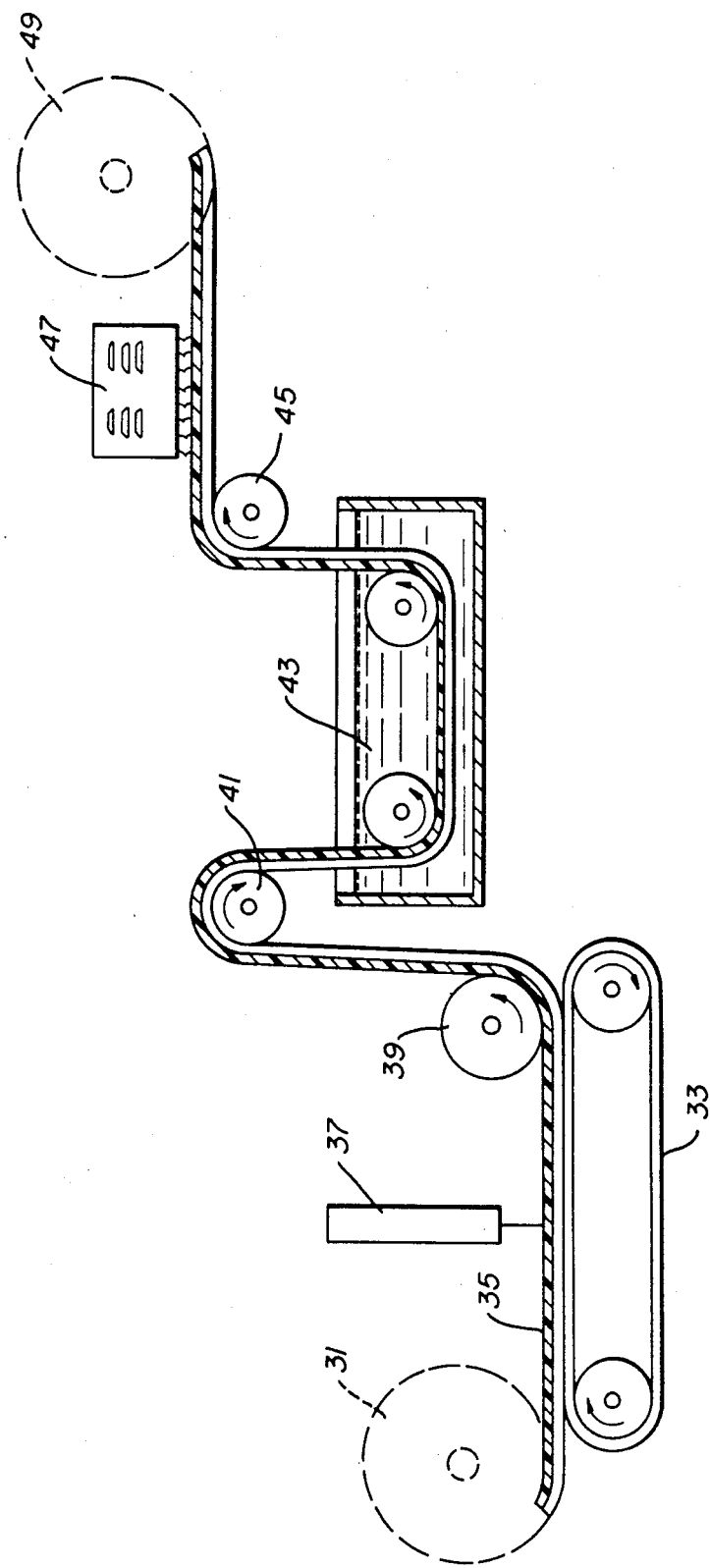
FIG._4.

FIG._5.
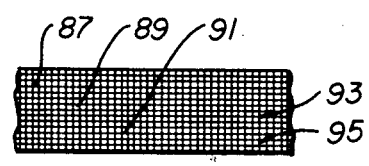
FIG._6.
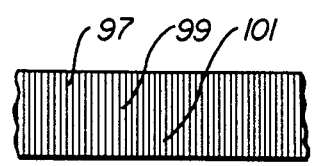
FIG._7.
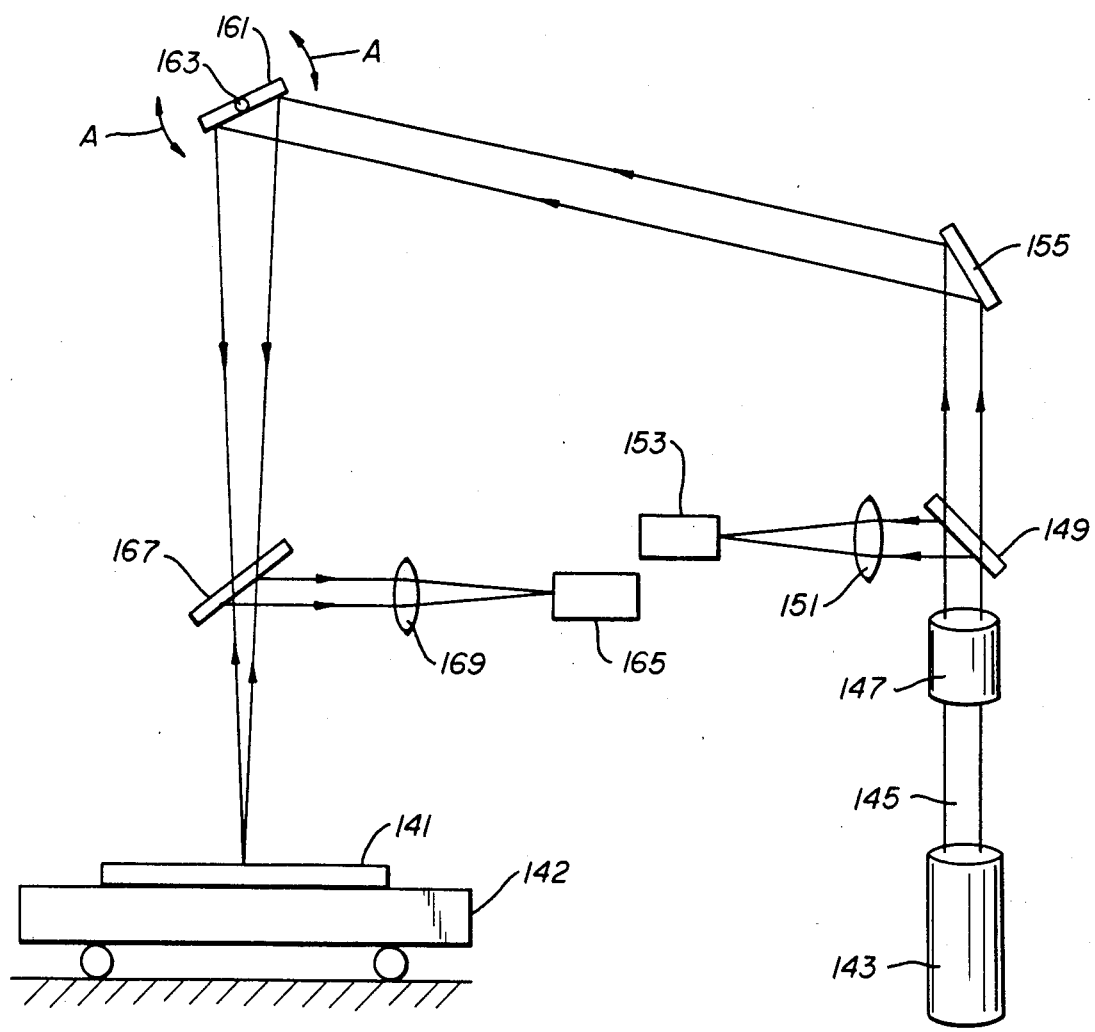
FIG._8.

HIGH CONTRAST OPTICAL MEMORY TAPE

CROSS-REFERENCE TO RELATED APPLICATIONS

This application is a continuation-in-part of application Ser. No. 935,999, filed Nov, 28, 1986 which is a continuation-in-part of application Ser. No. 896,988, filed Aug. 15, 1986 and a continuation-in-part of application Ser. No. 855,228, filed Apr. 23, 1986.

TECHNICAL FIELD

The invention relates to optical data storage and in particular to an optical tape having a high contrast medium adapted for laser recording of data.

BACKGROUND ART

In U.S. Pat. No. 4,239,338, Borrelli et al. teach an optical information storage medium comprising a glass substrate, a 100 Angstrom thick silver layer applied to the substrate, an oxide layer deposited over the silver layer and a multilayer additively colored AgCl/PbO film applied over the oxide layer. The film is optically bleachable using visible light to produce a dichroic, birefringent image The image is read in infrared light, since the film is transparent at infrared wavelengths down to the silver layers. The silver layer permits reading and writing in the reflective mode. The film should have a thickness not exceeding about two microns to permit high spot resolution In U.S. Pat. No. 4,278,756, Bouldin et al. teach a reflective laser recording and data storage medium formed from a photosensitive silver-halide emulsion. The emulsion is exposed and developed using a negative silver diffusion transfer process to make the film surface shiny compared to data spots which are clear or dark. The shiny surface may be above or below the main body of the emulsion depending on whether the reading light is to be introduced from above or from below through a clear substrate.

In reflective optical data storage media, high optical contrast between data spots and the media background and sharply defined data spots are necessary for resolving data, particularly where data spots are small, i.e. ten microns or less in size. For optical tape it is also desirable that the optical storage and recording media provide two capabilities in addition to high contrast and high resolution. The media should record with a laser beam, and it should be capable of pre-recording servo track guides or timing marks during manufacturing for those applications where such guides or timing marks are required. Optical tape is valuable with data bits as large as one to five microns while optical disks require data bits one micron or smaller to be valuable.

An object of this invention was to achieve adequate recording sensitivity for laser written data on reflective read optical storage media applicable to optical tape, while providing for optional pre-recording of track guides and other formatting information prior to completion of the finished tape and also providing for laser recording of data on finished optical tape.

DISCLOSURE OF THE INVENTION

The above object has been achieved with optical recording tape, having a sensitive laser recording medium which is also suitable for optional pre-recording of tracking or control information. Such a tape may be wound on a tape pack and used as an optical recording medium between two tape hubs, including a supply hub and a take-up hub. The medium is a laser recording material layer having a thin black upper crust of irregularly shaped metal particles forming a dark field with a clear underlayer and with a thin, reflective metallic layer beneath the laser sensitive medium, all supported on a flexible web backing. Both the crust and clear underlayer reside in the same layer and thus have the same contour. The thin dark crust is highly absorptive to light so that modification, displacement, and/or agglomeration of the metal particles in the crust by laser light reveals the shiny reflective metallic underlayer. A principal effect of laser light on the irregular metal particles is to modify their shape to that of smooth spheroids with reduced covering power. The medium is suitable for track pre-recording because it can be patterned with track guides on the surface prior to formation of the dark field.

The optical storage medium can be made in the following way. A transparent film substrate layer is covered with three layers to form the optical storage material. Over the film substrate layer, a very thin reflective metallic layer is vacuum or vapor deposited, with a total thickness typically of 100 to 1000 Angstroms. Over this reflective layer is a photographic-type gelatin layer which has within it a very thin crust of irregular but nonfilamentary low reflectivity black silver particles. This very thin layer shall be referred to as the black silver crust. The black silver crust may be at the upper surface farthest from the reflective layer or it could be nearer to the reflective layer. This black silver crust may be patterned with clear areas for tracking and control functions since the black silver is created by conversion of a photosensitive emulsion by a photographic exposure and development process.

The developed image pattern transmits light with respect to the surrounding dark, light-absorptive field. Optical contrast is enhanced by means of the metallic layer just above the substrate which reflects light back in the direction from whence it came. The metallic layer may be either gold, silver, aluminum, platinum, rhodium or copper.

The very thin black silver reflectively read medium of the present invention is a more sensitive laser recording medium compared to some prior film based materials. Additionally, optical contrast is enhanced by means of the underlying reflective layer. The combination of the thin black silver layer, the gelatin layer and the highly reflective metal layer form an optical data storage medium for optical memory cards which has a good laser recording sensitivity, a capability of photolithographically pre-recording track formats and a capability of laser recording data or track formats on finished tape.

BRIEF DESCRIPTION OF DRAWINGS

FIG. 1 is a perspective view of tape rolls supporting optical recording tape of the present invention.

FIG. 2 is an enlarged portion of optical tape of FIG. 1 revealing data spots.

FIG. 3 is a side sectional view of the optical tape taken along the line 3—3 in FIG. 2.

FIG. 3a is a detail magnified about line 3A—3A in FIG. 3.

FIG. 3b is a side sectional view similar to FIG. 3 of an alternate embodiment of optical tape of the present invention.

FIG. 4 is a side view of an apparatus for forming optical tape in accord with the present invention.

FIGS. 5-7 are top views of portions of strips of optical recording tape in accord with the present invention, showing pre-recorded servo track guides disposed on the tape in various directions.

FIG. 8 is a plan view of optical apparatus for reading and writing on a strip of tape with a laser.

BEST MODE FOR CARRYING OUT THE INVENTION

With reference to FIG. 1, a supply tape hub 11 is seen dispensing a tape web 13 to a tape take-up hub 15, the tape passing around turning or support posts 17 and 19. The tape is an optical recording medium capable of laser writing. The tape has a width ranging from 1 cm to 5.5 cm and is relatively thin, about 400 microns or less, although this is not critical. Tape web 13 is typically about 300 meters long and has a capacity of over one-half terabyte of data. A linear array 21 of semiconductor diode lasers records parallel, spaced-apart tracks of data on the tape by modifying, displacing, or agglomerating absorptive metal particles in the tape medium. Alternatively, a single laser emitting a beam that repeatedly scans laterally across the tape as the tape is advanced past a scanning station may be used. The writing system guides the laser beam so that data are written or read in parallel paths. Servo track guides may be provided on the tape to guide the laser beam or beams. However, such track guides are not essential in most applications. It is important that parallelism be maintained accurately, so a mechanical alignment mechanism, not shown, may be used to insure that the position of the tape passing in front of laser array 21 is proper. Moreover, all portions of the tape should experience uniform lateral tension so that the tape is not squeezed together between opposite edges.

The tape path illustrated in FIG. 1 is a very simple path with drive power being applied directly to one of the hubs by a transport mechanism. The tape may be reversed in direction of travel by applying power to the opposite hub. Hubs may be driven directly by motors or by belts attached to pulleys in power communication relation to the hubs. Sometimes more complicated systems of posts and tape paths are used for high-speed tape transport. Typically, tape may be advanced in either direction at a rate of about 5 meters per second. Thus, data on a 300 meter long tape web can be accessed in under 60 seconds and in about 30 seconds on average. A read head could be combined with the laser bar writing mechanism 21 to form a read/write system. The read head would consist of a number of photo diodes or CCD elements in a linear array, spaced similarly as the laser bar 21, except being vertically movable, as by a servo controlled piezoelectric element in order to maintain the read elements in a data path following position.

With reference to FIG. 2, a magnified view of laser recorded data on the tape 13 may be seen. The border 16, corresponds to a small tape segment in FIG. 1. Data are recorded by forming spots 18 and 20 which contrast with the surrounding field of the tape. Data spots 18 are seen to be circular and aligned in paths. A second group of data spots 20 is seen to be aligned in a second path. Spots 18 and 20, as well as an absence of spots 22, represent data bits. For example, spots 18 and 20 may represent 1's and the absence of spots 22 may represent 0's, or vice versa. Data spots 18 and 20 are typically reflective, with a reflectivity at near infrared wavelengths (0.8 to 1.0 microns) generally in the range of 30% to 50%, while the media background is substantially less reflective, with a reflectivity at near infrared wavelengths (0.8 to 1.0 microns) generally less than 20% and preferably less than 15%. Optical reflective contrast between the reflective data spots and the media background is therefore generally greater than 2 to 1 and preferably at least 3 to 1 at reading beam wavelengths. A minimum contrast between the data spots and the background field of 1.2 to 1 is sufficient for reading. The reflectivity of the data spots is not as high as the 80% to 90% expected from the reflective metals used since there are usually some silver particles remaining in the data spot area which absorb some of the incident and reflected light. The laser recorded spots may be oblong as well as circular. All of the data spots could have similar dimensions which are preferably 5 microns or less in size. Alternatively, the 1's and 0's could be represented by long and short data spots. The spacing between paths is not critical, and may even be adjoining, provided that the optical reading system is able to easily distinguish between paths.

The recording material which is selected should be compatible with the laser used for writing on it. Some materials have a higher recording sensitivity than others at certain wavelengths. Good recording sensitivity to near-infrared light is preferred because semiconductor lasers creating the required light beams are readily available. The selected recording material should have a favorable signal-to-noise ratio and form high contrast databits with read/write systems with which it is used. The material should not lose data when subjected to temperatures of about 140° F. (60° C.) for long periods. The material should also be capable of recording at speeds of at least one hundred thousand bits per second.

With reference to FIGS. 3 and 3a, the optical recording media comprises a film substrate layer 23, a highly reflective metallic layer 24 deposited on substrate layer 23 and a selected, thin black silver planar crust 26, generally less than one-half micron thick, within gelatin layer 25. The latter layer is generally one to six microns thick, disposed on metallic layer 24, which is generally 100 Angstroms to 1000 Angstroms thick. During the optical medium manufacturing process the surface of a photosensitive emulsion, such as an AgCl-gelatin emulsion, distal to the substrate, is developed to dark or black by exposure to actinic radiation and then to photographic development. Black and clear images can be created if desired by using a photomask. The exposing image is a pattern of control indicia such as tracks to be pre-recorded. The depth of the dark layer is typically 0.3 to 0.5 microns. The undeveloped remainder of the emulsion layer which is essentially gelatin remains clear. Film substrate layer 23 is disposed over a flexible web backing in intimate contact therewith in planar relation. Backing 12 may be transparent or opaque. Backing 12 should be self-supporting, yet sufficiently flexible so that the tape is spoolable, i.e. so that a length of tape may be wound on a tape hub. A transparent, planar protective layer 28 may be disposed over the laser recording layer 26. Polycarbonate plastic material is one of the preferred cover layers and may be a thin laminating sheet adhered over the tape or, alternatively, a lacquer coating.

Film substrate layer 23 is typically about 100 to 150 microns thick, and may be composed of polyesters, cellulose acetate, Mylar, or other materials commonly used as film bases. Metallic layer 24 is typically composed of either gold, copper, silver, aluminum or alloys thereof. Gold is preferred because it has a very high reflectivity at the reading wavelength, at least 90 percent in the near infrared, i.e. a wavelength longer than 0.8 microns, thereby giving high data contrast. Also, gold does not react with the photographic chemicals and is environmentally stable for many years. Gold is also desirable because it may be used with photographic emulsion layers 25 and 26 with actinic wavelengths in the blue to green wavelength range (0.4 to 0.6 microns) with reduced halation effect since gold's reflectivity is about 37% in this actinic wavelength range and gelatin layer 25 is generally less than 3 microns thick. Silver and aluminum are also preferred materials but care must be taken that the aluminum does not contaminate the photographic developer solutions. Copper may also be considered for this application but is not as chemically stable as the other three materials. Metallic layer 24 is deposited on film substrate 23 by well-known vapor or vacuum deposition techniques, for example in coating silicon wafers or magnetic metallic memory disks. The layer is on the order of 100 to 1,000 Angstroms thick.

Gelatin layer 25 originally was the gelatin matrix containing a photographic emulsion layer. The gelatin colloid matrix should be made from material which is substantially transparent to a read beam wavelength in the near infrared, and may be further selected to be substantially more absorptive at an actinic wavelength thereby enhancing the antihalation properties of the recording medium during the preformatting process. Gelatin layer 25 is typically under 3 microns thick, but could be as thick as 10 microns. The gelatin layer 25 containing crust 26 is shown having been exposed to actinic radiation and then developed to be substantially dark only at its surface. Irregular rings in planar crust 26 represent black irregular or oblong silver particles embedded in the gelatin colloid matrix.

Areas 18 and 20 represent data spots which have been laser recorded by modification, displacement, and/or agglomeration of metal particles in the crust 26 to be predominantly clear, revealing an underlying reflectivity in the metallic layer 24 when illuminated by light of a read beam wavelength, typically in the near infrared. The laser recording beam principally heats the thin crust 26 and alters the irregular shape of the silver grains so that they become smooth. In doing so, the covering power of the silver grains is reduced so that light can pass through the spot of modified crust into the underlayer. Heating may also cause some displacement of silver particles away from the spot area as well as some agglomeration of separate silver particles. Clear areas 18 are preferably sharply defined, rather than diffuse or otherwise blurred. The optical density of background areas 22 at the read beam wavelength of gelatin layer 25 should be at least 0.5 and preferably greater than 1.0. The optical density of the spot areas 18 of gelatin layer 25 should be not more than 0.2 and preferably less than 0.1.

A method for making the optical storage tape 13 in FIG. 1 comprises depositing metallic layer 24 onto a flexible self-supporting film substrate web 23 by vacuum or vapor deposition and then applying the thin, planar photosensitive emulsion layer 25 over a reflective metallic layer 24 or alternatively a thin photosensitive emulsion layer over a gelatin layer covering a reflective metallic layer. Alternatively, the thickness of the laser sensitive recording layer can be controlled in the manufacture of the photosensitive starting material of the present invention.

A very thin (0.25-0.5 $\mu$m) photosensitive emulsion can be coated over clear gelatin to achieve the thin recording layer. The resulting photosensitive web is then processed by exposure, development and fixing, as described in greater detail below, to produce a laser sensitive, but not photosensitive medium. Track guides and other control indicia may be photolithographically prerecorded during the processing of the photosensitive web, if desired, by imagewise exposure through a mask. The finished laser sensitive medium is then applied to a flexible web backing 12 by disposing film substrate web 23 over backing 12. A planar, transparent protective layer 28 may finally be adhered over optical storage layer 25.

Alternatively, tape may be formed without film substrate web 23, as seen in FIG. 3b. Metallic layer 24 may be deposited directly onto web backing 12, and emulsion layer 25, containing the black silver crust 26, disposed over metallic layer 24, instead of first forming tape 13 from layers 23, 24 and 25. Also, the disposing of the photosensitive web or individual layers 24 and 25 to backing 12 may be performed prior to exposure, development and fixing. It is preferred, however, to complete processing of tape 13 first since it will be easier to handle when it is no longer photosensitive. Again, a transparent protective layer 28 may be adhered over optical storage layer 25

FIG. 4 illustrates photographic processing for producing a laser sensitive optical tape medium from a photosensitive web. Photosensitive web 35, stored on a reel 31, is driven by a tape advancing mechanism 33 beneath a source 37 of actinic radiation. Source 37 may be a laser bar or other source of green, blue or ultraviolet light which illuminates the web surface. Typically, the actinic light has a wavelength in the blue-green range of 0.4 to 0.6 microns, although ultraviolet light with wavelengths less than 0.4 microns may also be used. Web 35 is thus exposed to create a latent image. The entire mechanism in FIG. 4 is shielded in a protective housing which preserves the light sensitive character of web 35.

The emulsion layer is preferably a fine grain silver chloride emulsion in a gelatin matrix. Other silver halides, such as silver bromide, may be used, but must be developed in a modified developer solution disclosed below to prevent formation of filamentary silver. The smaller the grain sizes of the silver-halide emulsion, the higher the resolution of the final pre-recorded product of this invention. The emulsion grain size should be less than 5% of the recording data spot size for best results, and emulsions with grain size on the order of 0.05 microns are commercially available. Antihalation dyes, also known as attenuating or accutance dyes, may also be added to the photographic emulsion to increase the absorptivity of the emulsion at the actinic wavelength thereby concentrating the exposure to the top surface of the emulsion. This can help create a thin black recording crust. It can also reduce any halation effect and give higher resolutions. Such dyes are commonly used and are water soluble and thus are not present when the emulsion has been converted to the optical storage media.

If pre-recording of track guides is desired, a shielding mask may be placed over unexposed web 35. The mask would typically have two degrees of transmissivity to actinic radiation, being substantially clear over most of its extent, except for an imagewise pattern of optically dense lines for forming track guides.

Turning idlers 39 and 41 advance the exposed tape web into a processing solution 43 where the web is developed and fixed. Additional tanks, not shown, are used for this process. Exposure by web 35 to actinic radiation creates a latent image in which silver halide is activated substantially to saturation. The exposed web is surface developed to produce a medium which is substantially dark over most of its extent, but which may have an imagewise exposure pattern of partially clear track guides revealing the underlying reflectivity in the metallic layer for light of read beam wavelength. Development of the surface layer is surface development occuring typically within the top 0.3 to 0.5 micron of the emulsion layer in a plane distal from the substrate. Such development occurs by contacting the light exposed image layer with a concentrated development solution for a very short period, before the development solution can diffuse into the material or by means of a slow-diffusing developer such as tertiary butylhydroquinone.

Alternatively, a vabiscous developer thickened with carboxymethylcellulose may be used. This material is syrupy in consistency and is rolled on. It may be washed off and development stopped with a spray stop bath. It then is treated with a fixing bath. Crusts as thin as five to ten percent of the thickness of a ten to fifteen micron emulsion layer have been made. During development, areas containing black irregular or oblong silver particles are formed from activated silver-halide areas. The volume concentration of activated silver halide at the emulsion surface determines the volume concentration of oblong silver particles, which in turn determines the optical density of the emulsion layer. Areas containing silver particles should exhibit an optical density as measured with red light of a photographic densitometer of at least 0.5 and preferably greater than 1.0, while any unexposed track guide areas should have densities less than 0.2. Subsequent to development, fixing and rinse steps remove the remaining silver halide from emulsion layer 35.

Exposed silver chloride emulsions, when developed, produce irregularly shaped spheroidal silver particles which are highly absorptive, i.e. black, and which respond to a laser recording beam by modification into bright smooth spherical silver particles. However, exposed silver bromide emulsions produce filamentary silver particles when developed. Filamentary silver, while black, does not respond to the recording laser beam in the same way as irregular spheroid silver particles, and when filamentary silver is present in the thin crust, performance is greatly degraded. In order to produce irregular spheroidal silver particles from a silver bromide emulsion, organic stabilizers or antifoggants are included in the developing solution. These compounds include, for example, organic thiols, such as 1-phenyl-1H-tetrazole-5-thiol, 1-phenyl-2-imidazolidine-thione, and 4,4,5-trimethyl-4H-pyrazole-3-thiol. Previously, these components have been used to control the growth of reflective silver spheres in diffusion transfer photography. In the present instance, the compounds attach themselves to the unreacted silver bromide and inhibit the action of the chemical developing agent. In doing so, the shape of the resulting silver grains is that of irregular spheroids which form a crust with substantial covering power, i.e. low transmissivity. As already noted, silver chloride emulsions result in irregular spheroid silver grains without the use of organic antifoggants.

The tape is advanced past idler 45 and beneath a drying unit 47 after processing has converted it into an optical recording material. The laser sensitive medium is then wound on a takeup hub 49 and stored for future use.

FIGS. 5-7 show the placement of servo track guides on optical tape. In FIG. 5, the track guides 81, 83 and 85 extend longitudinally parallel to the lengthwise direction of the tape web. The track guides are spaced apart at least wide enough to accommodate data spots between the guides, although several writing areas could be associated with one track guide. As an example, the track guides may be 10 microns apart, with data spots having a size of three microns between the guides and a servo track guide line width of three microns.

While lengthwise servo tracks are preferred, it is also possible to have side-to-side servo tracks. As seen in FIG. 7, the track guides 97, 99, 101 and so on, are again parallel, but transverse to the lengthwise direction of the tape. Such tracks are known as lateral tracks, to distinguish them from the lengthwise tracks previously described. Lateral tracks consist of parallel, closely spaced tracks with a line-to-line separation, approximately the same as for longitudinal tracks. The spacing must be sufficient to accommodate a data path between adjacent tracks or in some relation to a track, such as overlying it, with enough room for adjacent paths.

Lateral data paths would be written by a scanning laser which sweeps across the width of the tape as the tape is advanced past a scanning station. In the read situation, data could be detected by a linear array of detector elements, such as a CCD array. An adjacent servo track, if any, would be detected when a continuous line is observed by the array. The linear array would be aligned parallel to the servo tracks with tape motion synchronized with detector electronics, allowing the detector array a sufficient time to observe a pattern on the tape as the tape advances past the detector array. The tape need not stop for observation, but may move continuously past the detector array.

In FIG. 6, the track guides run in two perpendicular directions. For example, guides 87, 89 and 91 extend longitudinally parallel to the lengthwise direction of the tape web while guides 93 and 95 are aligned laterally, i.e. transverse to the direction of the tape web. In this case, a read system could follow either set of guides or treat the guides as forming a grid in which data are written in relation to the grid, either on the lines or tracks, or inside of the rectangles formed by the tracks. Data could be located by counting line crossings from marked reference positions. The grid pattern could also be used as a reference guide when strips of the tape are used for laser recording of data. The grid pattern forms can be used for alignment of data spots.

The final result of these processing steps is a superior laser recording medium comprised of a very thin black silver crust within one of the planar surfaces of a gelatin layer and a reflective underlayer which achieves good recording sensitivity, high contrast and resolution for laser recording of data. Laser recording on this medium is efficient, because the silver particles in the crust are absorptive causing a rise of temperature at the top surface of the crust, thereby facilitating the particle modification, displacement or agglomeration of the crust layer. Also, since the crust is thin, very little time is required for the laser beam to erode through the crust to reveal the reflective metallic layer beneath the gelatin layer. These irregular or oblong particles are absorptive of light energy over a very wide spectrum range from ultraviolet to near infrared, permitting a wide variety of lasers to be used for recording.

In FIG. 8, a side view of the widthwise dimension of optical tape 141 is seen. The tape is usually received over a movable holder 142 which functions as a mechanical alignment mechanism, bringing the tape into the trajectory of a laser beam or into proper position beneath a laser array. One arrangement of a laser array 21 with respect to the tape is seen in FIG. 1. In FIG. 10, a laser light source 143, preferably a pulsed semiconductor laser of near infrared wavelength emits a beam 145 which passes through collimating and focusing optics 147. The beam is sampled by a beam splitter 149 which transmits a portion of the beam through a focusing lens 151 to a photodetector 153. The detector 153 confirms laser writing and is not essential. The beam is then directed to a first mirror 155 and then toward a second servo controlled mirror 161.

Mirror 161 is mounted for rotation at pivot 163 in the direction indicated by the arrows A. The purpose of mirror 161 is to find the lateral edges of the tape in a coarse mode and then in a fine mode of operation to identify data paths which exist predetermined distances from the edges. Coarse lateral positioning may also be achieved by motion of the movable holder 142. The position of the holder may be established by a linear motor adjusted by a closed loop position servo system of the type used in magnetic disk drives. Track numbers and clocking information may be placed periodically along the length of the track for lengthwise positioning and to designate the beginning and end of data portions on the tape. Mirror 161 may also be operated in a scanning mode which sweeps the beam laterally across the tape as the tape advances to record or read data in lateral data paths.

The beam should deliver sufficient laser pulse energy to the surface of the recording material to create data spots. Typically, 5–20 milliwatts is required, depending on the recording material. A 20 milliwatt semiconductor laser, focused to a five micron beam size, records at temperatures of about 200° C. and is capable of creating spots in less than 25 microseconds. The wavelength of the laser should be compatible with the recording material. In the read mode, laser power is lowered to about 5% of the record power.

Optical contrast between a spot and surrounding field is detected by light detector 165 which may be a photodiode. Light is focused onto detector 165 by beam splitter 167 and focusing lens 169. A photodetector array such as a CCD could also be used. It could be either a linear array or area array. The number of detector elements per data spot would be approximately three elements to create a reading redundancy. The surface would be illuminated with low-cost light emitting diodes generating power primarily in the near infrared to match the sensitivity spectrum of the photodetector array.

Servo motors, not shown, control the positions of mirror 161 and drive the mirror and tape hubs in accord with instructions received from control circuits, as well as from feedback devices. The detector 165 produces electrical signals corresponding to data spots. These signals are processed and recorded for subsequent display as useful information regarding the transaction recorded on the tape. The tape may be used to record various types of data, as digital medical images, oil well logging data, satellite survey data, insurance records, personal information, or financial transactions and it may also be used for publishing information.

We claim:

1. Optical memory tape for laser recording optical information comprising,
   a self-supporting, flexible web backing,
   a vacuum or vapor deposited reflective metallic layer over said web backing,
   a planar optical storage layer disposed over the reflective metallic layer, said optical storage layer having a planar crust of irregular, non-filamentary and oblong black silver particles within the top one-half micron of the layer distal to the backing and substantially clear gelatin below the crust.

2. The optical memory tape of claim 1 further comprising a film substrate web disposed over said backing in intimate contact therewith in planar relation, said reflective metallic layer deposited on said film substrate web.

3. The optical memory tape of claim 1 wherein said reflective metallic layer is selected from the group consisting of gold, silver, aluminum, platinum, rhodium, copper and alloys thereof 4. The optical memory tape of claim 1 wherein a transparent, protective, planar layer is disposed over said optical storage layer.

5. The optical memory tape of claim 1 wherein said optical storage layer contains laser written data.

6. The optical memory tape of claim 1 wherein said optical storage layer contains prerecorded control information.

7. A method for making an optical memory tape comprising,
   depositing by vacuum or vapor a reflective metallic layer over a self-supporting, flexible web backing,
   disposing a planar photosensitive emulsion layer over said metallic layer,
   developing and fixing only a planar crust of said emulsion to a substantially dark thin layer of irregular, non-filamentary silver particles with substantially clear gelatin layer beneath said crust, and
   disposing a transparent, planar protective layer over said planar crust.

8. The method of claim 7 further defined by
   making an imagewise exposure of marks representing control indicia, said exposure made in said photosensitive emulsion layer with actinic radiation, and
   developing and fixing said exposure pattern of image marks being substantially clear revealing an underlying reflectivity in the metallic layer when illuminated by light.

9. A method for making an optical memory tape comprising,
   depositing by vacuum or vapor a reflective metallic layer onto a transparent film substrate web,
   disposing a planar photosensitive emulsion layer over said metallic layer,
   developing and fixing only a planar crust of said emulsion to be a substantially dark thin layer of irregular, non-filamentary silver particles with a substantially clear gelatin layer beneath said crust, said film substrate layer, said reflective metallic layer and said developed and fixed emulsion layer forming a laser recordable optical storage film,
   disposing said developed optical storage film over a self-supporting, flexible web backing, and disposing a transparent, planar protective layer over said planar crust.

10. The method of claim 9 further comprising,
making an imagewise exposure of marks representing control indicia, said exposure made in said photosensitive emulsion layer with actinic radiation, and
developing and fixing said exposure pattern of image marks being substantially clear revealing an underlying reflectivity in the metallic layer when illuminated by light, said developing and fixing occuring prior to disposing said developed optical storage film over said plastic base.

11. The method of claim 9 wherein said photosensitive emulsion layer is composed of a silver chloride emulsion.

12. The method of claim 9 wherein said photosensitive emulsion layer is composed of a silver bromide emulsion and developing said emulsion is performed with a chemical developer containing an organic antifoggant.

13. The optical memory data of claim 1 wherein said black silver particles have an irregular spheroidal shape.

* * * * *